United States Patent [19]  [11] 3,948,858
Wiersum  [45] Apr. 6, 1976

[54] POLYMERIZATION OF ETHYLENICALLY UNSATURATED COMPOUNDS

[75] Inventor: Ulfert Elle Wiersum, Velp, Netherlands

[73] Assignee: Akzo N.V., Arnhem, Netherlands

[22] Filed: Sept. 20, 1974

[21] Appl. No.: 507,795

[30] Foreign Application Priority Data
Sept. 22, 1973  Netherlands...................... 7313098

[52] U.S. Cl..................... 260/75 UA; 260/77.5 UA;
260/78.4 UA; 260/80 C; 260/93.5 R;
260/94.9 CA; 260/465 D; 260/465 E;
260/465 F; 260/465 G; 260/864
[51] Int. Cl.²................. C08F 112/08; C08G 63/12

[58] Field of Search.......... 260/465 H, 465 G, 80 C, 260/93.5 R, 75 UA, 77.5 UA, 864

[56] References Cited
UNITED STATES PATENTS
2,751,406   6/1956   Ipatieff et al. ...................... 260/465
3,726,837   4/1973   de Jongh et al............. 260/77.5 UA

*Primary Examiner*—Lewis Gotts
*Assistant Examiner*—Dolph H. Torrence
*Attorney, Agent, or Firm*—Stevens, Davis, Miller & Mosher

[57]  ABSTRACT

A process for effecting chemical reaction by radical initiation is provided wherein a 1,2-diaryl-1,2-cyano-1,2-dihaloethane compound is used as the initiator.

6 Claims, No Drawings

POLYMERIZATION OF ETHYLENICALLY UNSATURATED COMPOUNDS

This invention relates generally to a process for carrying out chemical reactions initiated by radicals and more particularly to an improvement in such processes using a 1,2-diaryl-1,2-dicyano-ethane compound as a radical initiator.

As examples of reactions initiated by radicals may be mentioned: substitution reactions, for instance the chlorination of the side chain of toluene; alternating substitution and addition reactions, for instance the addition of cyclohexane to formaldehyde; polymerization reactions of ethylenically unsaturated compounds such as styrene, methylmethacrylate, acrylonitrile, vinyl acetate; the curing of polymers, for instance unsaturated polyester resins, and the cross-linking of unsaturated rubbers.

As radical initiators for carrying out such reactions it has been proposed before to apply certain 1,2-diaryl-1,2-dicyano-ethane compounds, for instance: 1,2-diaryl-1,2-dicyano-ethane compounds bearing an acyl group or an esterified carboxyl group in the 1- and the 2-position (see the Dutch Patent Application No. 6,910,428) and 1,2-diaryl-1,1,2,2-tetracyano-ethane derivatives of which the two aryl groups bear an inert substituent in at least the para-position (see the Dutch Patent Application No. 7,110,624).

Surprisingly, it has now been found that ethane compounds containing a given halogen atom, namely a chlorine or a bromine atom on each central carbon atom, to which are also attached an aryl group and a cyano group, may be used to advantage as a radical initiator. An advantage of these radical initiators is that they may be used as initiator in the polymerization of ethylenically unsaturated compounds at elevated temperatures, say at 110°C. Moreover, the present radical initiators have a reactivity that is approximately equal to or higher than that of the frequently used peroxides, dicumyl peroxide and di-tert.butyl peroxide.

The radical initiators provided by the invention are 1,2-diaryl-1,2-dicyano-1,2-dihaloethane compounds the halogen of which are chlorine and/or bromine atoms.

The two aryl groups, which are linked with the ethane carbon atoms and which each generally contain 6 to 30 carbon atoms, are preferably phenyl groups; but may also be other aryl groups such as naphthyl-, anthracyl-, and phenanthryl groups. Although, in principle, all available hydrogen atoms in the aryl groups may be replaced by other groups, the groups that are preferred besides the phenyl group are the ortho-, meta- and/or para-substituted aryl groups. As examples of possible substituents in the aryl groups may be mentioned: alkyl groups with 1 to 4 carbon atoms, aryl groups, fluorine atoms, chlorine atoms, bromine atoms, and iodine atoms, acyl groups, aroyl groups, esterified or non-esterified carboxyl groups, alkoxy groups, aryloxy groups, acetylated or non-acetylated amino groups, in which the hydrogen atoms may have been replaced or not by other groups, nitro-groups, alkyl- or arylsulphonyl groups, or alkyl- or arylsulfinyl groups and cyano groups. If desired, the inert substituents in the two aryl groups may differ in either aryl group and/or from one aryl group to the other. If desired, the radical initiators may be mixed with other known radical initiators.

For the purpose indicated the use of the above-mentioned compounds has a number of advantages over the use of the known radical initiators. Compared with the frequently used peroxides they have the advantage that they act more specifically and do not give rise to undesirable side reactions, such as the formation of undesirable cross-linkages. An additional advantage is that, unlike the peroxides, the compounds according to the invention are substantially inactive at room temperature, so that at such a temperature they can be left in the reaction mixture for an indefinite time without this giving rise to a reaction. This makes it possible for the reaction to be carried out at any particular time desired by simply raising the temperature of the mixture. This is of importance particularly in polymer chemistry, where there is often need for durable, deformable compositions that can be caused to polymerize at any time by heating them. This is a procedure commonly applied in cases where use is made of unsaturated polyester resins. This constitutes an advantage over the commonly used method in which polymerization is effected by adding an initiator to the mass shortly before the shaping process, which addition is followed by the material starting to polymerize. Disadvantages of this method are the mixing shortly before use and the short duration used for the subsequent shaping process. Over the use of azodinitriles or peroxides they have the advantage of not giving rise to the evolution of gas, which is inadmissible in a number of reactions initiated by radicals or to badly smelling compounds. The compounds have a high resistance to heat. For instance, while in a dilute solution they can be boiled in chlorobenzene (boiling point 132°C) for several days without being subject to any change. An additional advantage offered by the compounds to be used according to the invention is that they are insensitive to oxygen. This is very surprising in that nearly all the known radical initiating substituted ethanes are highly sensitive to oxygen, as a result of which they can be used only in a medium that has thoroughly been freed from oxygen. That the radical initiators applied according to the invention are highly resistant to oxygen is evidenced by the fact that in a solution of, for example, ortho-dichlorobenzene they can for many hours be shaken with oxygen at 150°C without any oxygen being taken up.

In the process according to the invention compositions of radical initiators and polymerizable compounds such as monomers, prepolymers or polymers, which may still be provided with cross-links, can be fabricated into any desired shape and cured by heating. By curing is to be understood here polymerization in a wide sense, which means that it need not necessarily be attended with the formation of cross-links. Fabricating into the desired shape of the composition of radical initiators and polymerizable compounds may include, for instance, the providing of covering layers, the casting into shapes, the application of the compositions on to glass fiber structures, the impregnation of various types of material, injection molding, extrusion, vacuum forming, or any other shaping technique.

The process according to the invention may with advantage be applied in several stages. For instance, a monomer may be mixed with the radical initiator(s) according to the invention and polymerization may be started by heating. The polymerization process may be interrupted by reducing the temperature. At that stage the polymerization product consists of a mixture of monomer and polymer (in the present description also referred to as prepolymer), which upon being formed into the desired shape may be further polymerized. Prior to further polymerization the prepolymer may, of course, be mixed with compounds which in the further polymerization serve as cross-linking agents.

As examples of compounds that may be polymerized according to the invention may be mentioned: styrene, α-methyl styrene, ethene, propene, divinyl benzene, diallyl phthalate, diallyl carbonate, diallyl fumarate or mixtures of the afore-mentioned compounds. If desired, the ethylenically unsaturated monomers, more particularly styrene, may be mixed with an unsaturated polyester to form an "unsaturated polyester resin". The latter term is used in commerce to refer to a mixture of unsaturated polyester and unsaturated monomer such as styrene suitable for molding.

Polymerization reactions according to the invention may be carried out by one of the known techniques. For instance, the monomer or the monomer mixture as such may be polymerized; or polymerization may take place in a solution, a suspension, or an emulsion. For those skilled in the art these techniques need not be elucidated. If desired, the process may be carried out in the presence of usual additives. The radical initiators may be used in any usual initiating amount, for instance, in amounts of 0.01% to 3% by weight, based on the weight of the compounds to be initiated. Any suitable reaction temperature may be used but it will be usually between +40° and +200°C, but preferably between +90° and +150°C.

The radical initiators provided by the invention may be prepared by thermal dimerization of a compound having the general formula:

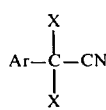

wherein Ar is a substituted or non-substituted aryl group having 6 to 30 carbon atoms and X a chlorine and/or bromine atom, the thermal dimerization being carried out by introducing the compound into a reaction vessel heated to a temperature of 350° to 800°C, using a very short time of contact, for instance, between 1/100 and about 10 seconds. If desired, dimerization may, or may not, take place in the presence of a carrier gas such as helium, nitrogen, carbon dioxide, argon or hydrogen. In the dimerization the partial pressure of the methane compound is about 1 to 600 mm, preferably 20 mm to 300 mm of mercury, but higher or lower partial pressures may also be applied.

The invention will be further explained in a number of examples. The reactivity of the radical initiators at a given temperature is referred to by the polymerization constant Kp used in the formula $Rp = Kp \cdot (M)(I)^{1/2}$, where Rp is the rate of polymerization, (M) the concentration of the monomer and (I) the concentration of the radical initiator (cf. Die Makromolkulare Chemie 157 (1972), p. 279 ff.) In these examples use is made of a 1,2-diaryl-1,2-dicyano-1,2-dihaloethane compound, in which the aryl group Ar and the halogen atom X have the meaning defined below.

| Radical initiator | Ar | X |
|---|---|---|
| 1 | phenyl | Cl |
| 2 | id | Br |
| 3 | naphthyl | Cl |
| 4 | o-chlorophenyl | Cl |
| 5 | m-chlorophenyl | Cl |
| 6 | m-bromophenyl | Br |
| 7 | m-methylphenyl | Cl |
| 8 | m-nitrophenyl | Cl |
| 9 | p-chlorophenyl | Cl |
| 10 | id | Br |
| 11 | p-bromophenyl | Br |
| 12 | p-methylphenyl | Cl |
| 13 | id | Br |
| 14 | p-tert.butylphenyl | Cl |
| 15 | p-methoxyphenyl | Cl |
| 16 | p-cyanophenyl | Cl |
| 17 | id | Br |
| 18 | o,p-dimethylphenyl | Cl |
| 19 | m,p-dichlorophenyl | Cl |
| 20 | o,p-dichlorophenyl | Cl |

EXAMPLE 1

100 ml of styrene are mixed with 0.67mmole of each of the radical initiators mentioned in Table 1. The resulting mixture is heated to 110°C, which temperature is maintained for 8 hours. Every 2 hours the percentage by weight of styrene that has polymerized is determined, which is done by taking a sample from which the polystyrene is isolated by precipitation with methanol followed by drying and weighing. The results obtained with the different radical initiators are listed in Table 1.

For comparison the results are shown of the experiments repeated in such a way that no radical initiator is used or different aryl-cyano-ethane compounds are employed as radical initiators.

Table 1

| Radical initiators | Yield in % after | | | |
|---|---|---|---|---|
| | 2 hours | 4 hours | 6 hours | 8 hours |
| None | 12.2 | 24.1 | 36.0 | 47.1 |
| 1,2-bis (2,6-dichloro phenyl) 1,2-dicyano ethane | 12.5 | 23.1 | 35.0 | 47.9 |
| 1-phenyl-2-(p-methyl phenyl)-1,2-dichloro-2-cyano ethane | 15.1 | 25.9 | 33.6 | 47.4 |
| 1 | 24.2 | 42.5 | 55.0 | 72.5 |
| 5 | 22.5 | 37.0 | 52.5 | 67.5 |
| 9 | 26.0 | 47.5 | 61.0 | 79.5 |
| 10 | 24.9 | 45.1 | 57.6 | 75.3 |
| 11 | 25.8 | 47.0 | 59.7 | 82.6 |
| 12 | 24.2 | 44.6 | 60.4 | 77.8 |
| 19 | 27.3 | 46.7 | 62.2 | 84.1 |

EXAMPLE 2

50 ml of styrene are mixed with 90.5 mg of each of the radical initiators mentioned in Table 2 and transferred to a dilatometer. The dilatometer is cooled down to −80°C, filled with nitrogen and subsequently evacuated; the last two operations are repeated three times. Thereupon the dilatometer is placed in a thermostatically controlled bath, which is set to the polymerization temperature mentioned in Table 2. By the dilatometric standard technique (cf. Angew. Chemie 59 (1947), p. 90) the contraction is determined, from which the conversion and then the Kp value are calculated. The results obtained are listed in Table 2. Moreover, for comparison, the table shows the results obtained with the known peroxides dicumyl peroxide and di-tert.butyl peroxide.

Table 2

| Radical initiator | $K_p \times 10^4$ Polymerization temperature | |
| --- | --- | --- |
| | 100°C | 110°C |
| dicumyl peroxide | 2.4 | 5.9 |
| ditert.butyl peroxide | 1.5 | 3.4 |
| 1 | 2.3 | 5.6 |
| 2 | 2.1 | 5.2 |
| 3 | 3.5 | 7.9 |
| 4 | 5.9 | — |
| 5 | 2.6 | 6.1 |
| 6 | 2.4 | 5.8 |
| 7 | 2.5 | 5.7 |
| 8 | — | 2.0 |
| 9 | 3.1 | 7.3 |
| 10 | 2.8 | 6.7 |
| 11 | 2.9 | 7.0 |
| 12 | 2.5 | 5.8 |
| 13 | 2.3 | 5.5 |
| 14 | 1.9 | 4.3 |
| 15 | 8.7 | — |
| 16 | 1.2 | 3.6 |
| 17 | 1.1 | 2.9 |
| 18 | 6.2 | — |
| 19 | 2.9 | 7.4 |
| 20 | 6.1 | — |

EXAMPLE 3

In a glass tube 25 grams of an unsaturated polyester (a polycondensate comprising maleic anhydride, phthalic anhydride, ethylene glycol and propylene glycol; trade name Ludopal P6) are mixed with 0.25 gram of radical initiator no. 9 and cured by heating to the temperature as indicated in Table 3. Moreover Table 3 lists the time elapsing before gelation takes place, the minimum curing time and the peak temperature.

Table 3

| | |
| --- | --- |
| Heating temperature | 100°C |
| Gelling time | 25.4 min. |
| Min. curing time | 31.3 min. |
| Peak temperature | 203°C |

Although the invention is described in detail for the purpose of illustration it is to be understood that such detail is solely for that purpose and that variations can be made therein by those skilled in the art without departing from the spirit and scope of the invention except as it may be limited by the claims.

What is claimed is:

1. In a process for carrying out the free radical polymerization of ethylenically unsaturated compounds, the improvement which comprises initiating the said reaction with a 1,2-diaryl-1,2-dicyano-1,2-dihaloethane compound wherein the halogens are chlorine or bromine.

2. The process of claim 1 wherein the radical initiator is a compound in which each aryl group has 6 to 30 carbon atoms.

3. The process of claim 1 wherein the radical initiator is a compound in which each aryl group is substituted in the ortho-, meta- or para-position.

4. The process of claim 1 wherein the ethylenically unsaturated compound is styrene.

5. The process of claim 1 wherein the ethylenically unsaturated compound is an unsaturated polyester resin.

6. The process of claim 1 wherein the said initiator is 1,2-diaryl-1,2-dicyano-1,2-dihaloethane wherein the halogens are chlorine or bromine and the aryl groups are phenyl, napthyl, anthracyl or phenanthryl groups.

* * * * *